(12) United States Patent
Kaneshima

(10) Patent No.: US 11,876,205 B2
(45) Date of Patent: Jan. 16, 2024

(54) POWER SUPPLY DEVICE WITH AIR INLET PIPE

(71) Applicant: Honda Motor Co., Ltd., Tokyo (JP)

(72) Inventor: Ryo Kaneshima, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 122 days.

(21) Appl. No.: 17/464,705

(22) Filed: Sep. 2, 2021

(65) Prior Publication Data

US 2022/0069383 A1 Mar. 3, 2022

(30) Foreign Application Priority Data

Sep. 3, 2020 (CN) .......................... 202021899931.7

(51) Int. Cl.
| | |
|---|---|
| *H01M 10/6563* | (2014.01) |
| *H01M 10/613* | (2014.01) |
| *H01M 10/625* | (2014.01) |
| *H01M 10/63* | (2014.01) |
| *H01M 10/6555* | (2014.01) |
| *H01M 50/249* | (2021.01) |
| *H01M 50/298* | (2021.01) |
| *H01M 50/204* | (2021.01) |
| *H01M 10/42* | (2006.01) |

(52) U.S. Cl.
CPC ..... *H01M 10/6563* (2015.04); *H01M 10/425* (2013.01); *H01M 10/613* (2015.04); *H01M 10/625* (2015.04); *H01M 10/63* (2015.04); *H01M 10/6555* (2015.04); *H01M 50/204* (2021.01); *H01M 50/249* (2021.01); *H01M 50/298* (2021.01); *H01M 2010/4278* (2013.01); *H01M 2220/20* (2013.01)

(58) Field of Classification Search
CPC .......... H01M 10/6563; H01M 10/613; H01M 10/625; H01M 10/63; H01M 10/6555; H01M 10/425; H01M 50/249; H01M 50/298; H01M 50/204
See application file for complete search history.

(56) References Cited

FOREIGN PATENT DOCUMENTS

| JP | 2016199106 | 12/2016 | | |
|---|---|---|---|---|
| WO | WO-9507198 A1 | * | 3/1995 | ............. B60R 11/06 |
| WO | WO-2005062400 A1 | * | 7/2005 | .......... H01M 10/613 |
| WO | WO-2010056750 A2 | * | 5/2010 | .............. B60L 50/64 |

OTHER PUBLICATIONS

Benjamin Hunting, Feb. 15, 2020, Is There Any Worse Than a Plastic Engine Cover? (Year: 2020).*

* cited by examiner

*Primary Examiner* — Jimmy Vo
(74) *Attorney, Agent, or Firm* — JCIPRNET

(57) ABSTRACT

A power supply device includes: a housing; a plurality of batteries stored in the housing; a plate member arranged between the plurality of batteries; an air inlet pipe arranged above the batteries and provided with an air inlet for introducing air from the outside of the housing to guide the air toward the batteries; a fastening portion configured to fasten the air inlet pipe on the plate member; and a recess structure provided around the fastening portion of the air inlet pipe and recessed toward the batteries, wherein the recess structure has a bottom portion and a sidewall portion, the bottom portion has a surface with an acute angle in a direction away from the air inlet, and the sidewall portion is connected to the bottom portion.

6 Claims, 5 Drawing Sheets

POWER SUPPLY DEVICE WITH AIR INLET PIPE

CROSS-REFERENCE TO RELATED APPLICATION

This application claims the priority benefits of China Patent Application No. 202021899931.7, filed on Sep. 3, 2020. The entirety of the above-mentioned patent application is hereby incorporated by reference herein and made a part of this specification.

BACKGROUND

Field of the Disclosure

The disclosure relates to a power supply device.

Description of Related Art

In known technologies, a power supply device for a vehicle includes a battery pack containing a plurality of batteries, a chassis for accommodating the battery pack, a cover that covers the opening of the chassis and shields the battery pack from the outside, and an air inlet pipe that guides air toward the battery pack. In this way, the power supply device can be mounted on the vehicle as a whole to supply power, and the air inlet pipe can guide air toward the battery pack to cool the battery pack, so as to ensure the heat dissipation effect of the power supply device.

Generally, in order to achieve the required heat dissipation effect, the air inlet pipe covers one side of the battery pack (for example on the top of the upper surface), air is guided through the air inlet, and the air flows to the battery pack through the internal channel of the air inlet pipe. This kind of air inlet pipe is relatively large. When such a large air inlet pipe is fixed on the battery pack, typically a fastening portion is provided on the air inlet pipe, and the air inlet pipe is fixed on a plate member of the battery pack through the fastening portion by using fixing members such as bolts. Under the circumstances, the fastening portion and the fixing member pass through an internal channel of the air inlet pipe which supplies the sucked air to the battery pack, which will hinder the flow of the sucked air and cause pressure loss at a position near the fastening portion.

LITERATURE OF RELATED ART

Patent Literature

[Patent Document 1] Japanese Laid-open No. 2016-199106

SUMMARY OF THE DISCLOSURE

The disclosure provides a power supply device, which can reduce the pressure loss caused to a fastening portion on an air inlet pipe when air is introduced.

The disclosure provides a power supply device, including: a housing; a plurality of batteries stored in the housing; a plate member arranged between the plurality of batteries; an air inlet pipe arranged above the batteries and provided with an air inlet for introducing air from the outside of the housing to guide the air toward the batteries; a fastening portion configured to fasten the air inlet pipe on the plate member; and a recess structure provided around the fastening portion of the air inlet pipe and recessed toward the batteries. The recess structure has a bottom portion and a sidewall portion, the bottom portion has a surface with an acute angle in a direction away from the air inlet, and the sidewall portion is connected to the bottom portion.

In an embodiment of the disclosure, the bottom portion is configured as a streamlined surface in a direction away from the air inlet.

In an embodiment of the disclosure, the sidewall portion is arranged obliquely in a direction in which a diameter of the recess structure is enlarged from the bottom portion toward an opposite direction.

In an embodiment of the disclosure, when the power supply device is mounted on a vehicle, the bottom portion is formed as a plane that is leveled with a front-rear direction of the vehicle. The sidewall portion is formed in a manner that its height from the bottom portion is lower when it is farther away from the fastening portion.

In an embodiment of the disclosure, the power supply device further includes: a wire harness, which exchanges power or communication in the power supply device; and a mounting portion, which is arranged on an outer surface of the air inlet pipe and configures the wire harness on the air inlet pipe. The mounting portion has a mounting wall portion, and the mounting wall portion is formed in a manner that its height from the outer surface is longer than a width of the wire harness.

In an embodiment of the disclosure, the power supply device further includes: a fan, configured for guiding a cold air to the batteries; and a control unit, configured for driving the fan, and the fan and the control unit are arranged at two opposite ends of the air inlet. A wire harness is electrically connected between the fan and the control unit, and is arranged in a manner of traversing the air inlet.

Based on the above, in the power supply device of the disclosure, the air inlet pipe guides air towards the batteries, the fastening portion fastens the air inlet pipe on the plate member, and the recess structure is arranged around the fastening portion of the air inlet pipe and is recessed toward the batteries. Furthermore, the recess structure has a bottom portion and a sidewall portion. The bottom portion has a surface with an acute angle in a direction away from the air inlet, and the sidewall portion is connected to the bottom portion, so that the recess structure appears sharp in the direction away from the air inlet. In this way, when the air introduced by the air inlet pipe flows through the fastening portion in the air inlet pipe, the air flows away from the air inlet along the inner part of the recess structure in the internal channel of the air inlet pipe, and is guided by the bottom portion with the surface having an acute angle. Therefore, the setting of the recess structure can reduce the pressure loss caused to the air inlet pipe at a position near the fastening portion. Accordingly, the power supply device of the disclosure can reduce the pressure loss caused to the fastening portion on the air inlet pipe when the air is introduced.

In order to make the above-mentioned features and advantages of the disclosure more obvious and comprehensible, the following embodiments are specially provided and are described in detail with reference to the accompanying drawings as follows.

DESCRIPTION OF EMBODIMENTS

Figure 1:
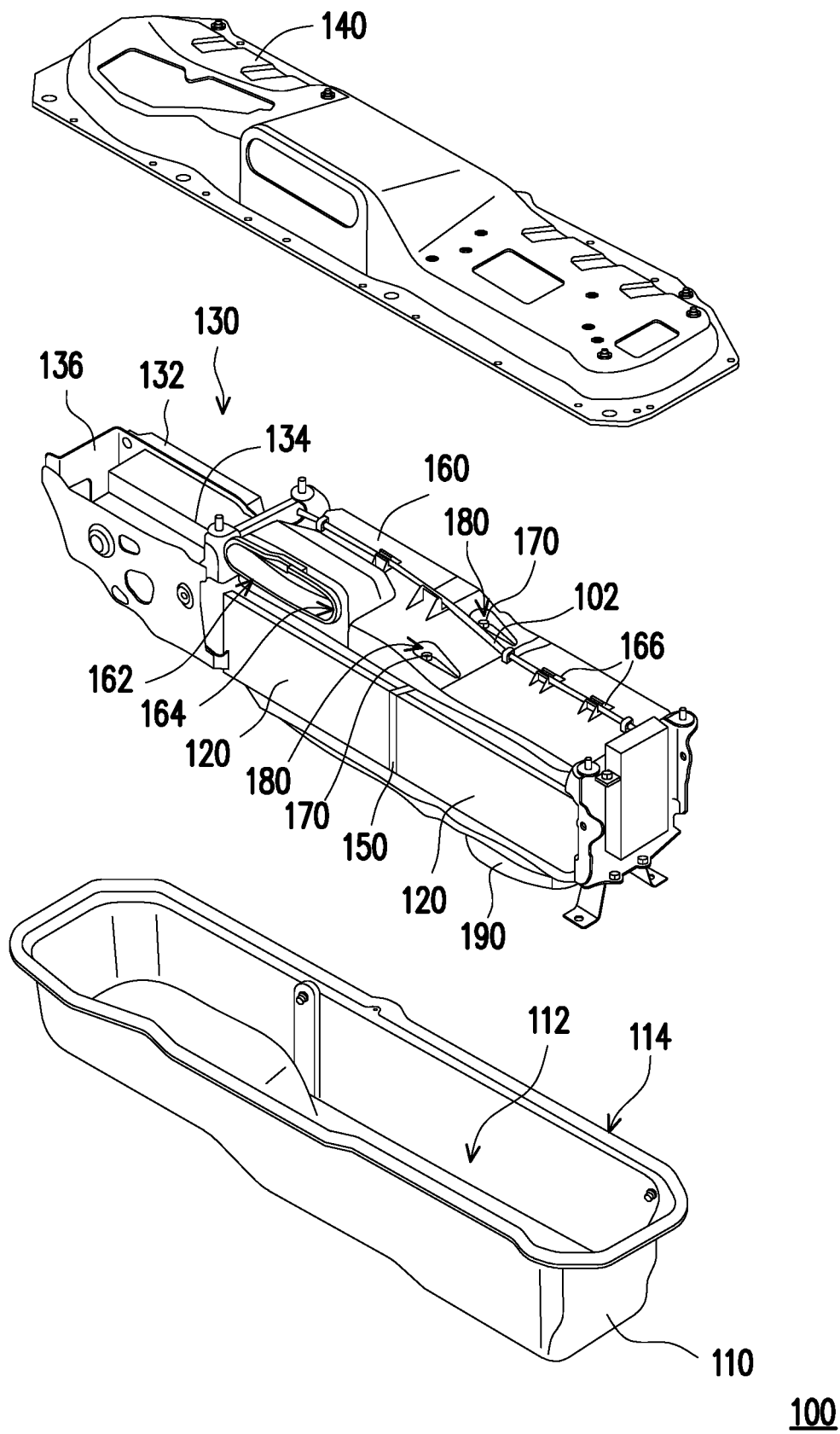
FIG. 1 is an exploded schematic view of a power supply device according to an embodiment of the disclosure.
Figure 2:
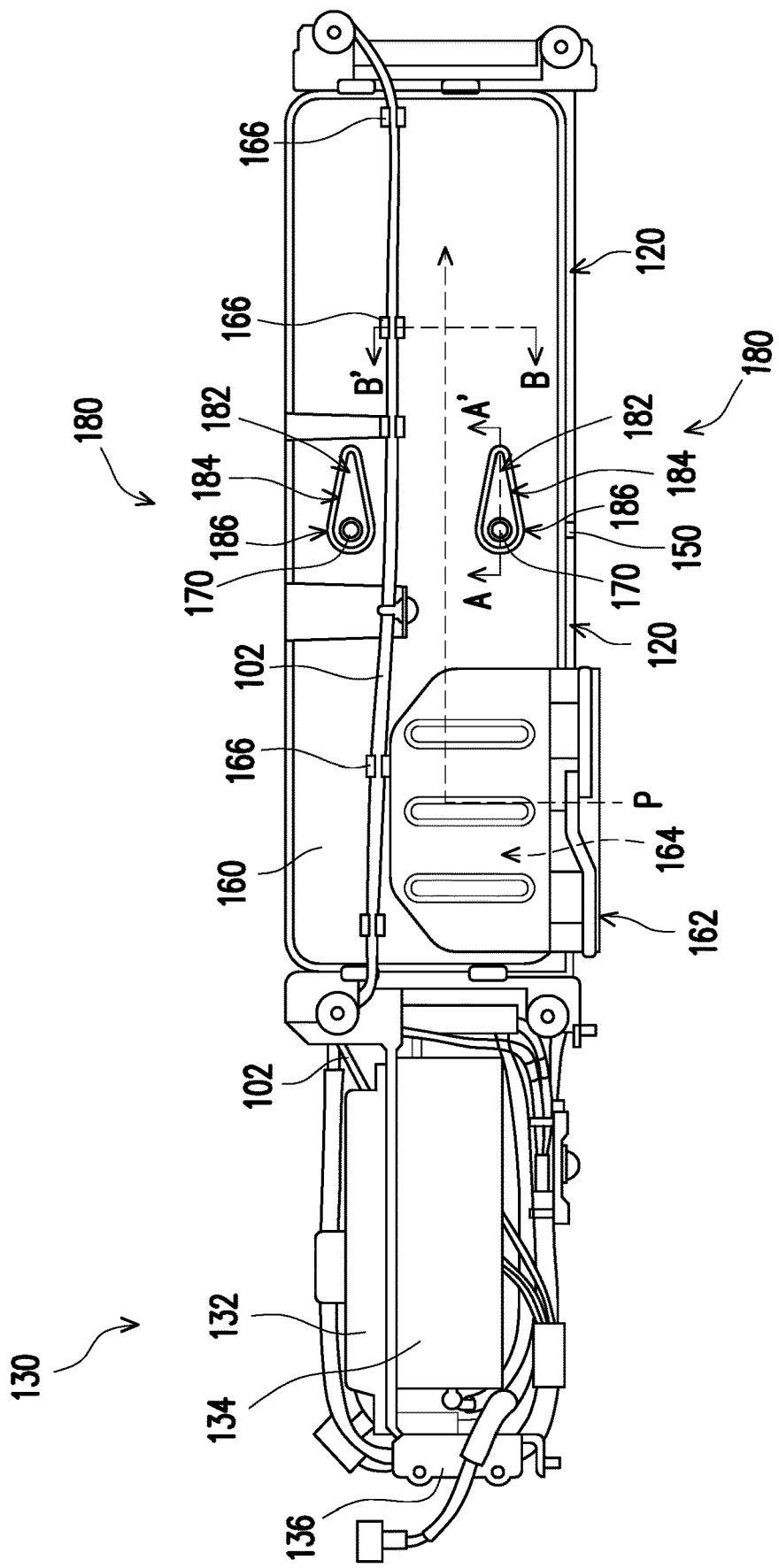
FIG. 2 is a perspective schematic view of the power supply device shown in FIG. 1 with housing and cover member removed.
Figure 3:
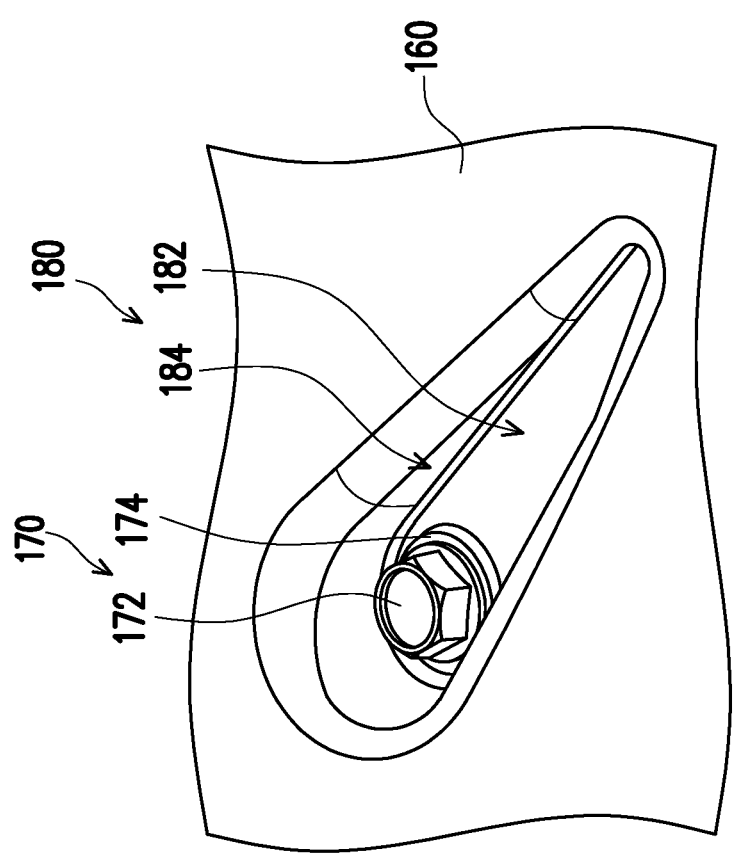
FIG. 3 is an enlarged schematic view of the fastening portion of the power supply device shown in FIG. 1.
Figure 4:
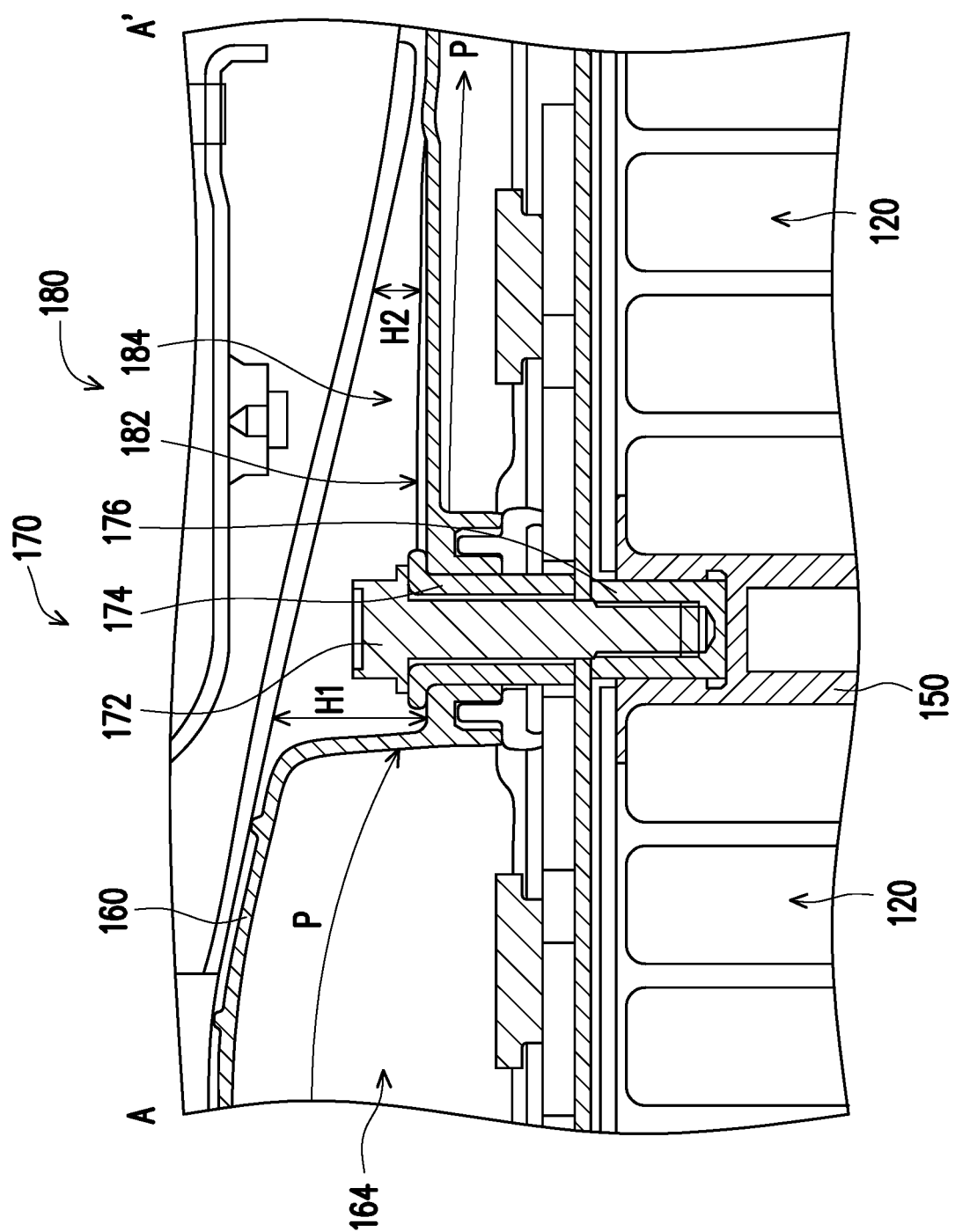
FIG. 4 is a schematic cross-sectional view of the power supply device shown in FIG. 2 taken along line A-A.
Figure 5:
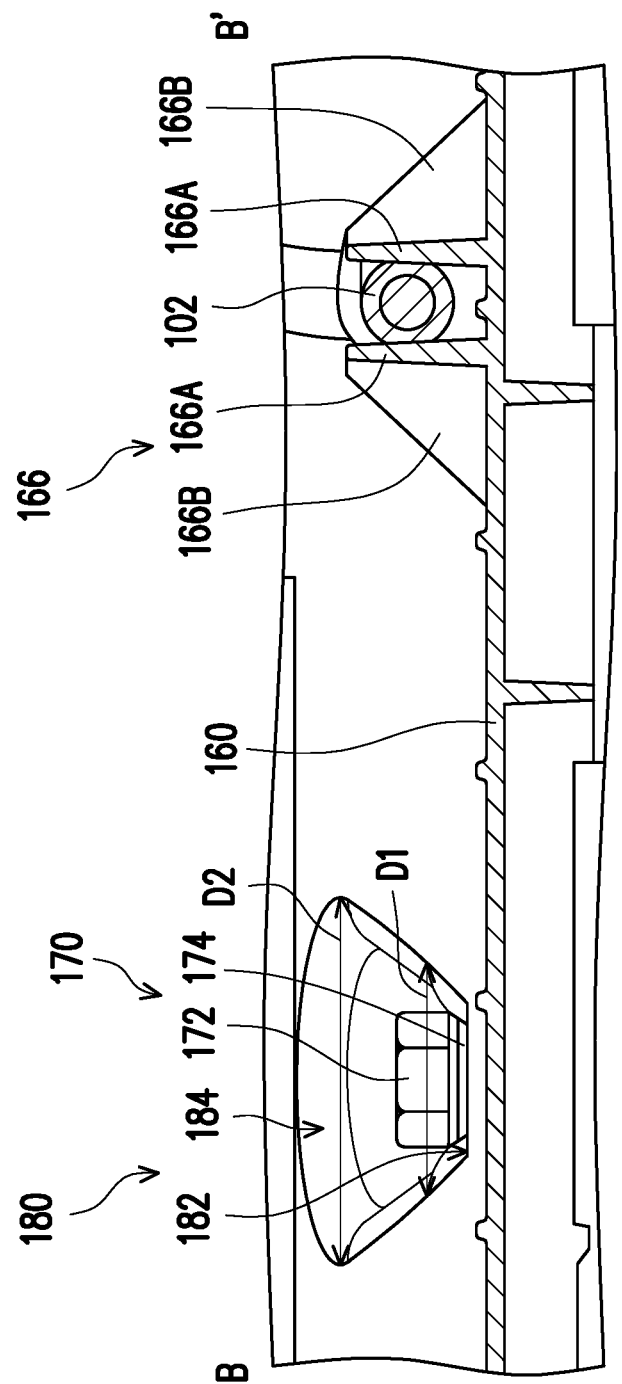
FIG. 5 is a schematic cross-sectional view of the power supply device shown in FIG. 2 taken along line B-B.

FIG. 1 is an exploded schematic view of a power supply device according to an embodiment of the disclosure. FIG. 2 is a perspective schematic view of the power supply device shown in FIG. 1 with housing and cover member removed. FIG. 3 is an enlarged schematic view of the fastening portion of the power supply device shown in FIG. 1. FIG. 4 is a schematic cross-sectional view of the power supply device shown in FIG. 2 taken along line A-A. FIG. 5 is a schematic cross-sectional view of the power supply device shown in FIG. 2 taken along line B-B. In this embodiment, the power supply device 100 can be mounted on a vehicle not shown. However, the disclosure provides no limitation to the use of the power supply device 100, and the use of the power supply device 100 can be adjusted according to requirements. Hereinafter, FIG. 1 to FIG. 5 will be incorporated to illustrate the overall structure of the power supply device 100 in this embodiment and an implementation as an example.

In detail, as shown in FIG. 1 and FIG. 2, in this embodiment, the power supply device 100 includes a housing 110, two batteries 120, an electronic component 130, a cover member 140, a plate member 150, an air inlet pipe 160, two fastening portions 170, and two recess structures 180. The housing 110 has an accommodating space 112 and an opening 114 communicating the accommodating space 112 and the outer environment. The two batteries 120 are put into the accommodating space 112 through the opening 114 and stored in the housing 110. The electronic component 130 and the batteries 120 are arranged side by side, and are also accommodated in the housing 110. The cover member 140 covers the opening 114 of the housing 110 to shield the batteries 120 and the electronic component 130 housed in the accommodating space 112 from the outside. The plate member 150 is arranged between the plurality of batteries 120 (between the two batteries 120 as shown in FIG. 1). Moreover, the air inlet pipe 160 is arranged above the batteries 120, and is provided with an air inlet 162 for introducing air from the outside of the housing 110 to guide the air toward the batteries 120. Two fastening portions 170 fasten the air inlet pipe 160 on the plate member 150, and two recess structures 180 are provided around the fastening portion 170 of the air inlet pipe 160 and are recessed toward the batteries 120. In this way, the power supply device 100 can be mounted on the vehicle as a whole to supply power. However, the disclosure provides no limitation to the specific structure of the power supply device 100, nor does the disclosure limits the number of the aforementioned components such as the batteries 120, the fastening portion 170, and the recess structure 180, which can be adjusted according to requirements.

In this embodiment, when the batteries 120 are cooled by the air inlet pipe 160, the air introduced via the air inlet 162 (shown in FIG. 1 and FIG. 2) flows in the internal channel 164 of the air inlet pipe 160. Since the air inlet pipe 160 is provided above the plurality of batteries 120, the internal channel 164 can guide air into the plurality of batteries 120 from above the batteries 120. Specifically, air flows from the air inlet 162 into the battery 120 located between the air inlet 162 and the plate member 150 (that is, the battery 120 on the left side of FIG. 2 and FIG. 4), and the air bypasses the fastening portion 170 and the recess structure 180 and flows into the battery 120 on the other side of the plate member 150 (that is, the battery 120 on the right side of FIG. 2 and FIG. 4). In this process, the air introduced by the air inlet 162 flows in the internal channel 164 of the air inlet pipe 160 along the path P shown by the dashed line in FIG. 2. In other words, the air flows from the air inlet 162 to the direction away from the air inlet 162 (as shown on the right side of FIG. 2). In this way, the batteries 120 can be cooled by the air introduced by the air inlet pipe 160.

Please refer to FIG. 3 to FIG. 5. In this embodiment, the fastening portion 170 includes a bolt 172, a sleeve 174 provided on the air inlet pipe 160 for the bolt 172 to be inserted, and a nut 176 embedded in the plate member 150, but the disclosure is not limited thereto. In this way, the bolt 172 penetrates the air inlet pipe 160 through the sleeve 174 and is screwed into the nut 176 to be fixed on the plate member 150 between the two batteries 120 (as shown in FIG. 4). Accordingly, the air inlet pipe 160 is fixed to one side of the batteries 120 (for example, the position above the upper surface). Furthermore, the recess structure 180 is provided on the air inlet pipe 160 and surrounds the fastening portion 170 and is recessed toward the batteries 120.

In this embodiment, the recess structure 180 has a bottom portion 182 and a sidewall portion 184. The bottom portion 182 has a surface with an acute angle in a direction away from the air inlet 162 (as shown in the lower right of FIG. 1 and FIG. 3, or the right side of FIG. 2 and FIG. 4), and the sidewall portion 184 is connected to the bottom portion 182. Preferably, the bottom portion 182 is further configured as a streamlined surface in a direction away from the air inlet 162 (as shown in FIG. 2, the bottom portion 182 has a streamlined arc portion 186 in a direction away from the air inlet 162 near the fastening portion 170). The sidewall portion 184 is erected on the bottom portion 182 and surrounds the edge of the bottom portion 182, so that the recess structure 180 appears sharp in a direction away from the air inlet 162. Moreover, as shown in FIG. 5, the sidewall portion 184 is arranged obliquely in a direction in which a diameter of the recess structure 180 is enlarged (i.e., the direction toward the upper side in FIG. 5) from the bottom portion 182 toward an opposite direction (i.e., the upper side of FIG. 5).

In other words, the edge of the bottom portion 182 may have a circular arc shape at the position adjacent to the fastening portion 170, and extend in a streamlined manner away from the air inlet 162 (that is, the arc portion 186) and converge to form an acute angle. Furthermore, the sidewall portion 184 extends upward from the edge of the bottom portion 182, and the sidewall portion 184 is inclined to the outside, so that the diameter of the recess structure 180 gradually enlarges from the bottom portion 182 toward the opposite direction (i.e., in the upper side of FIG. 5, for example, the diameter D1 of the recess structure 180 at a position adjacent to the bottom portion 182 (that is, the distance between the sidewall portions 184) is smaller than the diameter D2 of the recess structure 180 at a position away from the bottom portion 182 (that is, the distance between the sidewall portions 184).

In this way, when the air introduced by the air inlet 162 flows through the fastening portion 170 in the air inlet pipe 160, the air flows in the internal channel 164 of the air inlet pipe 160 along the path P shown in FIG. 4 to bypass the fastening portion 170 and the recess structure 180. Under the circumstances, the air flows away from the air inlet 162 (that is, the right side of FIG. 4) along the inner part of the recess structure 180, so the air converges at the acute-angled surface of the bottom portion 182 after being guided by the streamlined surface of the bottom portion 182. In addition, the sidewall portion 184 inclined to the outside can guide the air in the internal channel 164 to a portion exhibited as an acute angle. Accordingly, the recess structure 180 can reduce the obstruction caused to the air flowing through the air inlet pipe 160 after the fastening portion 170 is inserted into the air inlet pipe 160, thereby reducing the pressure loss.

Furthermore, in this embodiment, as shown in FIG. 4, when the power supply device 100 is mounted on the vehicle, the bottom portion 182 is formed as a plane that is leveled with the front-rear direction of the vehicle. The sidewall portion 184 is formed in a manner that its height from the bottom portion 182 is lower when it is farther away from the fastening portion 170. In other words, the acute-angled surface of the bottom portion 182 is a flat surface. When the power supply device 100 is mounted on a vehicle, the plane serving as the bottom portion 182 can be leveled in the front-rear direction of the vehicle. In addition, the height of the sidewall portion 184 from the bottom portion 182 reduces from the periphery of the fastening portion 170 toward the direction away from the fastening portion 170 (equivalent to the direction away from the air inlet 162). For example, the height H1 of the sidewall portion 184 from the bottom portion 182 at a position adjacent to the fastening portion 170 is greater than the height H2 of the sidewall portion 184 from the bottom portion 182 at a position away from the fastening portion 170.

It can be seen that in the recess structure 180 of this embodiment, the sidewall portion 184 is arranged around the bottom portion 182, but the portion corresponding to an acute-angled part of the bottom portion 182 is lowered in height to form an open state. In this way, even if water from the outside enters the recess structure 180, or dew is generated near the recess structure 180 to form water, the water can be discharged from the portion in an open state from the lower portion of the sidewall portion 184 in the recess structure 180. Therefore, it is possible to prevent water from accumulating in the recess structure 180, thereby preventing water from entering the inside of the power supply device 100 and preventing the metal bolt 172 and sleeve 174 in the fastening portion 170 from corroding.

Returning to FIG. 1 and FIG. 2, in this embodiment, the power supply device 100 further includes a control unit 132 constituting an electronic component 130. Furthermore, the electronic component 130 includes a control unit 132 and a switch member 134. The switch member 134 performs switch operations related to the batteries 120, such as closing the circuit of the batteries 120 when the vehicle is stopped or when the vehicle collides, or switches the batteries 120 when power is supplied to other components. The control unit 132 is, for example, an electronic control unit (ECU), and controls the batteries 120 or the switch member 134. The control unit 132 and the switch member 134 can be assembled together by the support member 136 or the like, so that the electronic component 130 is arranged side by side with the batteries 120 as a whole. However, the disclosure provides no limitation to the constitution of the electronic component 130, which can be adjusted according to requirements.

Furthermore, in this embodiment, as shown in FIG. 1 and FIG. 2, the power supply device 100 further includes a fan 190 (shown in FIG. 1, but not shown in FIG. 2 as being located under the battery 120 on the right side) for guiding a cold air to the batteries 120. The fan 190 is arranged on the other side of the batteries 120 opposite to the air inlet pipe 160, and the fan 190 and the control unit 132 of the electronic component 130 are arranged at two opposite ends of the air inlet 162. In other words, the air inlet pipe 160 and the fan 190 are respectively arranged on two opposite sides (such as the upper side and lower side of FIG. 1) of the batteries 120, thereby cooling the batteries 120 to improve the heat dissipation effect on the batteries 120. Furthermore, the control unit 132 is also configured for driving the fan 190. The fan 190 and the electronic component 130 are respectively disposed on two opposite sides of the batteries 120 (such as the right and left sides of FIG. 1), so that they do not interfere with each other in their respective configuration space. However, the disclosure provides no limitation to whether the fan 190 is provided or not, and the setting can be adjusted according to requirements.

Furthermore, in this embodiment, as shown in FIG. 2, the power supply device 100 further includes a wire harness 102 and a mounting portion 166 arranged on an outer surface of the air inlet pipe 160. The wire harness 102 exchanges power or communication in the power supply device 100, for example, is electrically connected between the fan 190 and the control unit 132, so that the control unit 132 can drive the fan 190, and the mounting portion 166 configures the wire harness 102 on the air inlet pipe 160. Under the circumstances, since the fan 190 and the control unit 132 are arranged at two opposite ends of the air inlet 162, the wire harness 102 is arranged in a manner of traversing the air inlet 162, such as passing through the two fastening portions 170 and the two recess structures 180 and connecting the fan 190 and the control unit 132 along the upper surface of the air inlet pipe 160. In this way, it is possible to arrange the wire harness 102 in a manner with good cooling effect and layout arrangement without interfering with other components.

In addition, as shown in FIG. 5, in this embodiment, the mounting portion 166 has a pair of mounting wall portions 166A and a pair of wing portions 166B correspondingly provided outside the pair of mounting wall portions 166A. The mounting wall portion 166A is erected on the outer surface of the air inlet pipe 160 and is formed in a manner that its height from the outer surface is longer than the width of the wire harness 102. Therefore, when the wire harness 102 is clamped between the pair of mounting wall portions 166A, the wire harness 102 does not exceed the height of the mounting wall portion 166A. Furthermore, the pair of wing portions 166B serves as a reinforcing structure on the outer side of the pair of mounting wall portions 166A. That is, when the wire harness 102 is arranged between the pair of mounting wall portions 166A, the pair of wing portions 166B can provide external support the pair of mounting wall portions 166A pushed by the wire harness 102 from the inside to prevent the pair of mounting wall portions 166A from being deformed. However, the disclosure provides no limitation to the specific structure of the mounting wall portion 166A and the wing portion 166B, nor does the disclosure limits the constitution of the mounting portion 166, as long as the mounting portion 166 can be used to arrange the wire harness 102, which can be adjusted according to requirements.

It can be seen from the above that the power supply device 100 in this embodiment can reduce the pressure loss caused to the fastening portion on the air inlet pipe when air is introduced by setting the recess structure 180 as described above. The above description is only one of the embodiments of the power supply device of the disclosure, and the disclosure is not limited thereto. For example, in other embodiments that are not shown, the fan 190 may be omitted, and other heat dissipation elements that are not shown may also be provided. Alternatively, one or three or more fastening portions 170 may be provided, and one or three or more recess structures 180 may be provided correspondingly. That is to say, on the premises of not exceeding the technical solution of the power supply device provided in the disclosure, the specific implementation can be adjusted according to requirements.

In summary, in the power supply device of the disclosure, the air inlet pipe guides air towards the batteries, the fastening portion fastens the air inlet pipe on the plate member, and the recess structure is arranged around the fastening portion of the air inlet pipe and is recessed toward the batteries. Furthermore, the recess structure has a bottom portion and a sidewall portion. The bottom portion has a surface with an acute angle in a direction away from the air inlet, and the sidewall portion is connected to the bottom portion, so that the recess structure appears sharp in the direction away from the air inlet. In this way, when the air introduced by the air inlet pipe flows through the fastening portion in the air inlet pipe, the air flows away from the air inlet along the inner part of the recess structure in the internal channel of the air inlet pipe, and is guided by the bottom portion with the surface having an acute angle. Therefore, compared with the fastening portion with a circular bottom surface used for fixing members such as bolts to pass through in the related art, the setting of the recess structure can reduce the pressure loss caused to the air inlet pipe at a position near the fastening portion. Accordingly, the power supply device of the disclosure can reduce the pressure loss caused to the fastening portion on the air inlet pipe when the air is introduced.

Finally, it should be noted that the above embodiments are only used to illustrate the technical solutions of the disclosure, not to limit it. Although the disclosure has been described in detail with reference to the foregoing embodiments, those of ordinary skill in the art should understand that: It is still possible to modify the technical solutions described in the foregoing embodiments, or equivalently replace some or all of the technical features; and these modifications or replacements do not make the essence of the corresponding technical solutions deviate from the scope of the technical solutions in the embodiments of the disclosure.

What is claimed is:

1. A power supply device, comprising:
   a housing;
   a plurality of batteries, stored in the housing;
   a plate member, arranged between the plurality of batteries;
   an air inlet pipe, arranged above the batteries and provided with an air inlet for introducing air from the outside of the housing to guide the air toward the batteries;
   a fastening portion, configured to fasten the air inlet pipe on the plate member; and
   a recess structure, provided around the fastening portion of the air inlet pipe and recessed toward the batteries,
   wherein the recess structure has a bottom portion and a sidewall portion, the bottom portion has a surface with an acute angle in a direction away from the air inlet, and the sidewall portion is connected to the bottom portion.

2. The power supply device according to claim 1, wherein,
   the bottom portion is configured as a streamlined surface in a direction away from the air inlet.

3. The power supply device according to claim 1, wherein,
   the sidewall portion is arranged obliquely in a direction in which a diameter of the recess structure is enlarged from the bottom portion toward an opposite direction.

4. The power supply device according to claim 1, wherein,
   when the power supply device is mounted on a vehicle, the bottom portion is formed as a plane that is leveled with a front-rear direction of the vehicle,
   the sidewall portion is formed in a manner that its height from the bottom portion is lower when it is farther away from the fastening portion.

5. The power supply device according to claim 1, further comprising:
   a wire harness, which exchanges power or communication in the power supply device; and
   a mounting portion, which is arranged on an outer surface of the air inlet pipe and configures the wire harness on the air inlet pipe, and
   the mounting portion has a mounting wall portion, and the mounting wall portion is formed in a manner that its height from the outer surface is longer than a width of the wire harness.

6. The power supply device according to claim 1, further comprising:
   a fan, configured for guiding a cold air to the batteries; and
   a control unit, configured for driving the fan,
   wherein the fan and the control unit are arranged at two opposite ends of the air inlet, and
   a wire harness is electrically connected between the fan and the control unit, and is arranged in a manner of traversing the air inlet.

* * * * *